(No Model.)
W. CUTTS.
FASTENER FOR FRAME JOINTS.
No. 349,631. Patented Sept. 21, 1886.
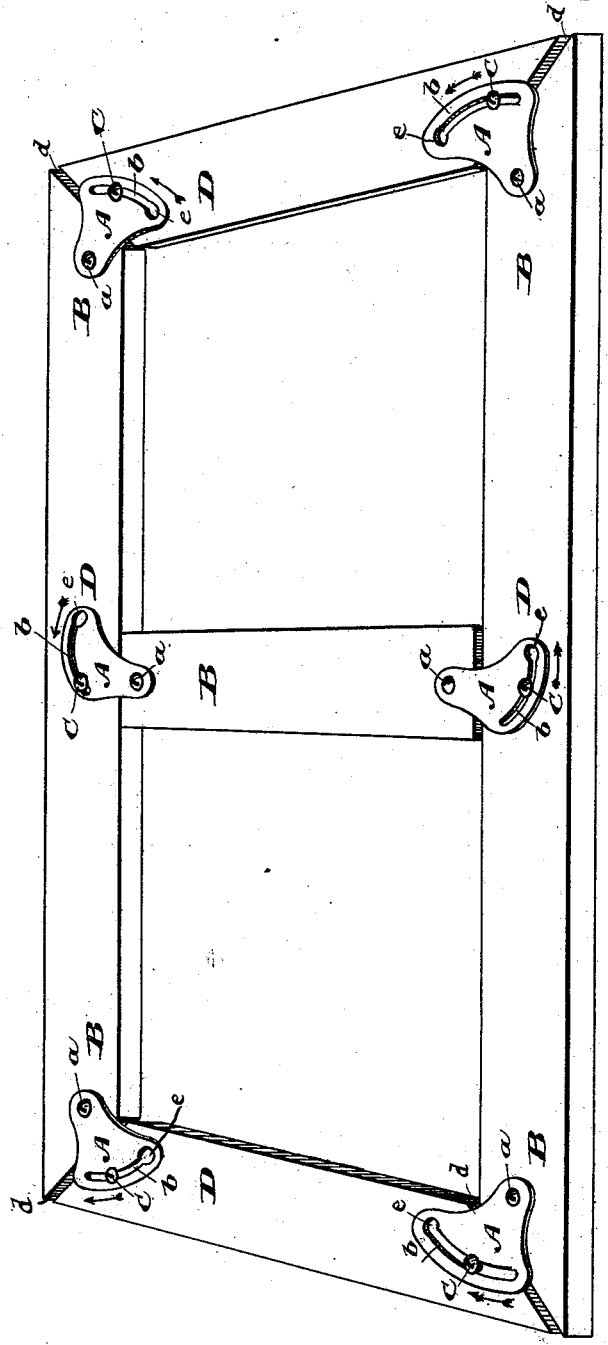
Witnesses.
F. B. Fetherstonhaugh
J. M. Jackson
Inventor.
Wm Cutts
by Donald C. Ridout & Co
Attys

United States Patent Office.

WILLIAM CUTTS, OF TORONTO, ONTARIO, CANADA.

FASTENER FOR FRAME-JOINTS.

SPECIFICATION forming part of Letters Patent No. 349,631, dated September 21, 1886.

Application filed January 28, 1886. Serial No. 190,090. (No model.)

*To all whom it may concern:*

Be it known that I, WILLIAM CUTTS, a subject of the Queen of Great Britain, residing at the city of Toronto, in the county of York, in the province of Ontario, Canada, artist, have invented an Improved Fastener for Frame-Joints, of which the following is a specification.

The object of the invention is to design an efficient fastening for frame-joints more particularly applicable to picture-frames; and it consists, essentially, of a plate pivoted on one side of the joint, and having a curved slot eccentric to its pivot formed in the plate, and designed to receive a headed pin or screw inserted into the portion of the frame on the opposite side of the joint from which the plate is pivoted, so that by turning the said plate upon its pivot the two parts mentioned of the frame are either expanded from or contracted toward each other, substantially as and for the purpose hereinafter more particularly explained.

The drawing represents a perspective view of a frame provided with my improved pivoted joint-plates.

In the drawing I show a frame having a plain miter-joint at each corner, and a bar having plain ends inserted in the center of the frame.

A represents my joint-plate shaped substantially as shown, and pivoted at *a* to the portion of the frame which I mark B. A curved slot, *b*, is made in the plate A eccentric to its pivot *a*, through which slot the headed pin or screw C passes, which pin or screw is inserted into the portion of the frame marked D, so that the pivot-pin *a* is on one side and the pin or screw C on the other side of the joint *d*. Consequently, as the slot *b* is eccentric from the pivot *a*, the turning of the plate upon its pivot must necessarily either expand or contract the joint—that is to say, if the plate is moved in the direction indicated by arrow, the joint *d* is expanded; but if moved in the direction indicated by the double-headed arrow, the joint *d* is contracted, as shown at the joint represented by the double-headed arrow.

From this description it will be seen that my improved fastener for frame-joints enables an artist to make an extremely light frame, and as no tongue and groove or other form of joint difficult to make is necessary, an unskilled person is able to make a suitable frame by the adoption of my fastener for frame-joints.

In the case of large picture-frames in which the joints are glued together, my fastener may be employed for maintaining the joint by contracting the two parts, as indicated at the joint where the double-headed arrow is shown.

I speak of the screw C as a headed pin or screw. I refer to the head because it is essential that a head should be formed on the pin or screw which passes through the slot *b*, in order that the plate A may be held with sufficient force against the frame to prevent it turning on its pivot when set.

With the view of enabling the pin or screw C to be inserted in or taken out of the slot *b* without being removed from its position, I form an enlargement, *e*, at one end of the slot *b* sufficiently large to permit the head of the pin or screw C to pass through in order that the shank of the pin or screw C may enter the slot *b*.

What I claim as my invention is—

1. A plate, A, pivoted at *a* on one side of the joint of the frame, and having a curved slot, *b*, made in it eccentric to its pivot *a*, in combination with a headed pin or screw, C, located as described, and fitting into the curved slot *b*, substantially as and for the purpose specified.

2. A plate, A, pivoted at *a* on one side of the joint of the frame, and having a curved slot, *b*, made in it eccentric to its pivot *a*, and an enlargement, *e*, at one end of the slot *b*, in combination with a headed pin or screw, C, located as described, and fitting into the curved slot *b*, substantially as and for the purpose specified.

Toronto, January 18, 1886.

WM. CUTTS.

In presence of—
R. P. ECHLIN,
FRED. W. GARVIN.